(12) United States Patent
Lee et al.

(10) Patent No.: US 11,260,700 B2
(45) Date of Patent: Mar. 1, 2022

(54) TIRE WITH MAIN KERFS AND SUB-KERFS

(71) Applicant: Hankook Tire Co., Ltd., Seoul (KR)

(72) Inventors: Eun Sil Lee, Daejeon (KR); Myeong Rak Choi, Daejeon (KR)

(73) Assignee: Hankook Tire Co., Ltd., Seoul (KR)

(*) Notice: Subject to any disclaimer, the term of this patent is extended or adjusted under 35 U.S.C. 154(b) by 119 days.

(21) Appl. No.: 16/194,777

(22) Filed: Nov. 19, 2018

(65) Prior Publication Data

US 2019/0283507 A1 Sep. 19, 2019

(30) Foreign Application Priority Data

Mar. 13, 2018 (KR) ........................ 10-2018-0029370

(51) Int. Cl.
*B60C 11/12* (2006.01)
*B60C 11/03* (2006.01)
*B60C 11/11* (2006.01)

(52) U.S. Cl.
CPC ...... *B60C 11/1236* (2013.01); *B60C 11/0309* (2013.01); *B60C 11/11* (2013.01); *B60C 11/1204* (2013.01); *B60C 11/1218* (2013.01); *B60C 11/1272* (2013.01); *B60C 11/1281* (2013.01); *B60C 2011/0353* (2013.01); *B60C 2011/0365* (2013.01); *B60C 2011/1209* (2013.01); *B60C 2011/1213* (2013.01)

(58) Field of Classification Search
CPC ............ B60C 11/1218; B60C 11/0323; B60C 11/1281; B60C 2011/1213; B60C 11/1272; B60C 11/1204; B60C 11/12
See application file for complete search history.

(56) References Cited

U.S. PATENT DOCUMENTS

| | | | |
|---|---|---|---|
| 2005/0109438 A1* | 5/2005 | Collette | B29D 30/0606 152/209.18 |
| 2013/0126062 A1* | 5/2013 | Palgen | B60C 11/1281 152/209.18 |
| 2015/0165828 A1* | 6/2015 | Kaji | B60C 11/1281 152/209.18 |

FOREIGN PATENT DOCUMENTS

| | | | | |
|---|---|---|---|---|
| JP | H01-101205 A | 4/1989 | | |
| JP | 4299804 B2 * | 7/2009 | ......... | B60C 11/1281 |
| KR | 101037410 B1 | 5/2011 | | |

* cited by examiner

*Primary Examiner* — Cedrick S Williams
(74) *Attorney, Agent, or Firm* — Novick, Kim & Lee, PLLC; Jae Youn Kim; Jihun Kim (57) ABSTRACT

The present invention relates to a tire with main kerfs and sub-kerfs, and more particularly, to a tire with main kerfs and sub-kerfs, which maintains drainage performance and running and braking performance by additionally including an auxiliary groove and improves a flow of air and drainage performance by including an auxiliary flow tube.

3 Claims, 8 Drawing Sheets

FIG. 1

Prior Art

TIRE WITH MAIN KERFS AND SUB-KERFS

BACKGROUND OF THE INVENTION

Field of the Invention

The present invention relates to a tire, and more particularly, to a tire with main kerfs and sub-kerfs, which is capable of maintaining drainage performance and running and braking performance even when a tread block is worn out.

Description of the Related Art

In general, a tire is one of the constituent parts of a vehicle and comes into direct contact with the road surface. The air within the tire absorbs the shock caused by the unevenness of the road surface by buffering action like a spring, thereby further enhancing ride comfort.

This tire includes a tread which is a rubber layer coming into contact with the road surface, a sidewall connected to the tread to form the side of the tire, a bead connected to the sidewall and fixed to the rim of the tire, a carcass installed inside the tire to form a frame while having strong fatigue resistance against the bending motion of the sidewall, and a belt disposed between the tread and the carcass to protect the carcass and improve the stiffness of the tread surface.

In the tire, the tread coming into contact with the ground has various block patterns, and a kerf as part of the tread is formed on the block of the tread to improve braking performance or to prevent a side slip phenomenon on the wet road surface.

Figure 1:
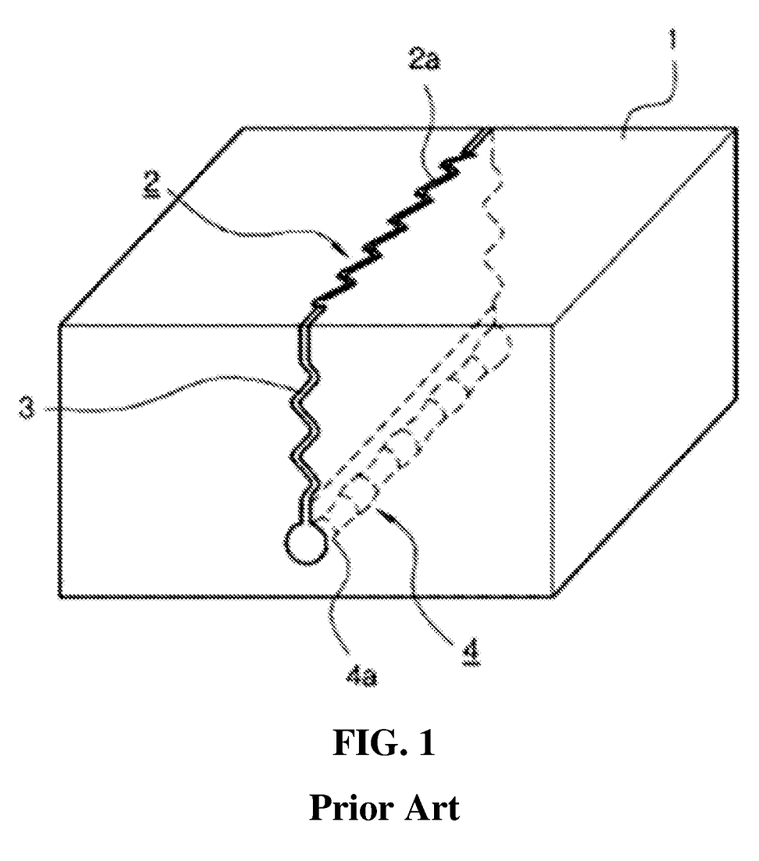
FIG. 1 is a perspective view illustrating a conventional tread block.

As illustrated in Korean Patent No. 10-1037410 of FIG. 1, to enhance the braking and durability of a tire on the surface of water and ice using a tread kerf 2 on a tread block 1, the tread kerf 2 has a structure in which its lower end connected to an inlet 2a of the tread kerf 2 through a corrugated connection hole 3 is formed of a flow tube 4 so as to have a larger capacity than the inlet 2a of the tread kerf 2, thereby rapidly increasing a flow of air and a drainage speed.

However, when the tread is worn out due to long running in the structures of the conventional tread kerf, the tread kerf is worn out, which leads to a reduction in drainage performance and grip performance.

CITATION LIST

Patent Literature

Patent Literature 1: Korean Patent No. 10-1037410 (May 20, 2011)

SUMMARY OF THE INVENTION

It is an object of the present invention to provide a tire with main kerfs and sub-kerfs, which is capable of maintaining constant drainage performance and grip performance even when a tread is worn out.

The present invention is not limited to the above-mentioned object, and other objects of the present invention can be clearly understood by those skilled in the art to which the present invention pertains from the following description.

To accomplish the object described above, a tire with main kerfs and sub-kerfs according to an aspect of the present invention includes a tread block formed in a block shape on a tread coming into contact with the road surface, a main groove formed to the center of the tread block across its upper surface, a main flow tube connected to a lower end of the main groove to pass through a side surface of the tread block, thereby improving a flow of air and drainage performance, an auxiliary groove connected to a lower end of the main flow tube to extend to a lower end of the tread block, thereby exhibiting drainage performance and running and braking performance, and an auxiliary flow tube connected to a lower end of the auxiliary groove to pass through the side surface of the tread block, thereby improving a flow of air and drainage performance.

In the aspect of the present invention, the auxiliary flow tube may have an inner diameter that is greater than the width of the auxiliary groove and smaller than inner diameter of the main flow tube.

In the aspect of the present invention, the auxiliary groove and the auxiliary flow tube may have a plurality of edges perpendicular to the road surface so as to exhibit drainage and braking capabilities when the tread block is worn out.

In the aspect of the present invention, the main groove may be formed in a zigzag shape on the upper surface and side surface of the tread block to improve drainage and braking capabilities.

In the aspect of the present invention, the auxiliary groove and the auxiliary flow tube consist of at least one auxiliary groove and auxiliary flow tube, respectively, so that they are connected to the main flow tube and arranged radially from the center of the main flow tube.

In the aspect of the present invention, when one auxiliary groove and one auxiliary flow tube are formed, central axes of the auxiliary groove and the auxiliary flow tube and central axes of the main grove and the main flow tube may be disposed on the same line from the side surface of the tread block.

In the aspect of the present invention, when the auxiliary groove and the auxiliary flow tube are plural in number, they may be arranged at equal intervals from the central axis of the main flow tube so as to exhibit constant drainage and braking capabilities.

DETAILED DESCRIPTION OF THE
PREFERRED EMBODIMENTS

Reference will now be made in detail to exemplary embodiments of the present invention, examples of which are illustrated in the accompanying drawings. The present invention may, however, be embodied in different forms and should not be construed as limited to the embodiments set forth herein. For clear explanation of the present invention, parts irrelevant to the description may be omitted in the drawings, and like reference numerals refer to like parts throughout the specification.

In the whole specification, it will be understood that when an element is referred to as being "connected (joined, contacted, or coupled)" to another element, it can be "directly connected" to the other element or it can be "indirectly connected" to the other element with other elements being interposed therebetween. In addition, it will be understood that when a component is referred to as "comprising or including" any component, it does not exclude other components, but can further comprise or include the other components unless otherwise specified.

The terminology used in the present disclosure is for the purpose of describing particular embodiments only and is not intended to limit the invention. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, exemplary embodiments of the present invention will be described in detail with reference to the accompanying drawings.

Figure 2:
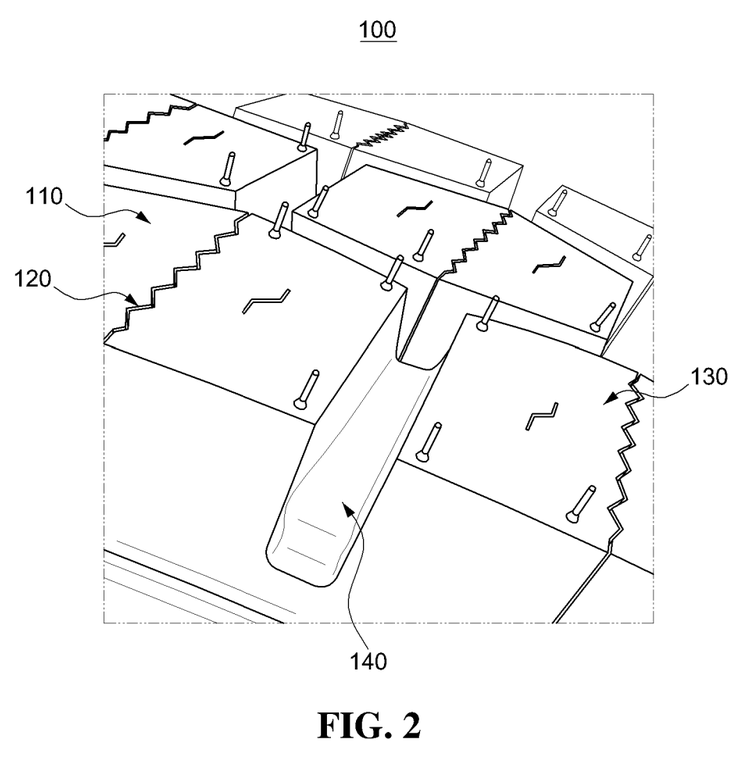
FIG. 2 is a perspective view illustrating a tire with main kerfs and sub-kerfs according to an embodiment of the present invention.
Figure 3:
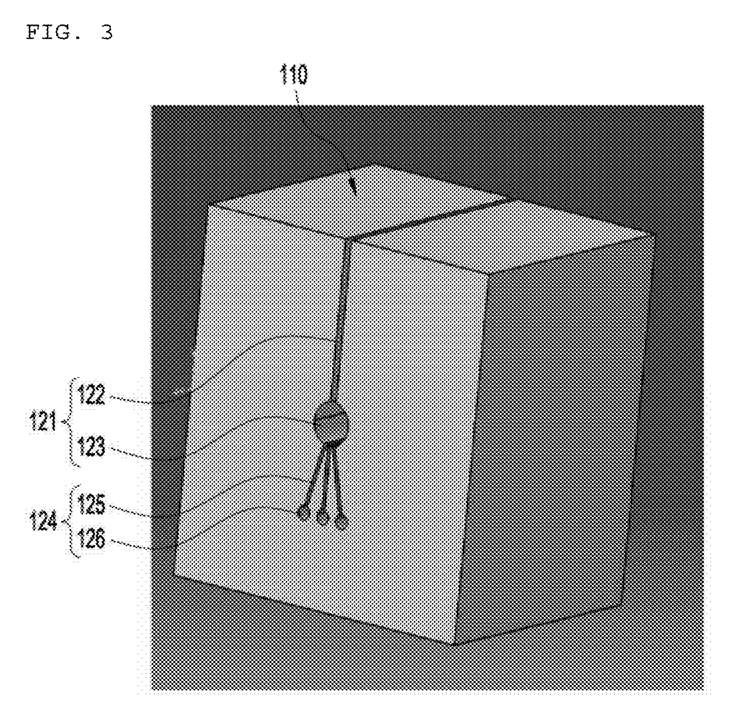
FIG. 3 is a perspective view illustrating a tread block of the heavy-duty tire with main kerfs and sub-kerfs according to the embodiment of the present invention.
Figure 4:
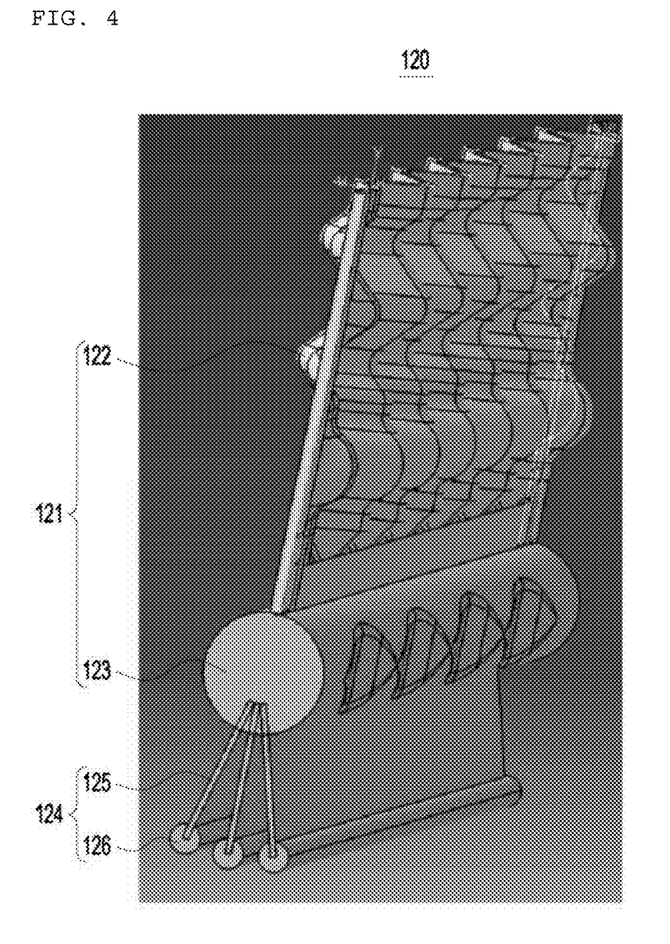
FIG. 4 is a perspective view illustrating a tread kerf of the heavy-duty tire according to the embodiment of the present invention.
Figure 5:
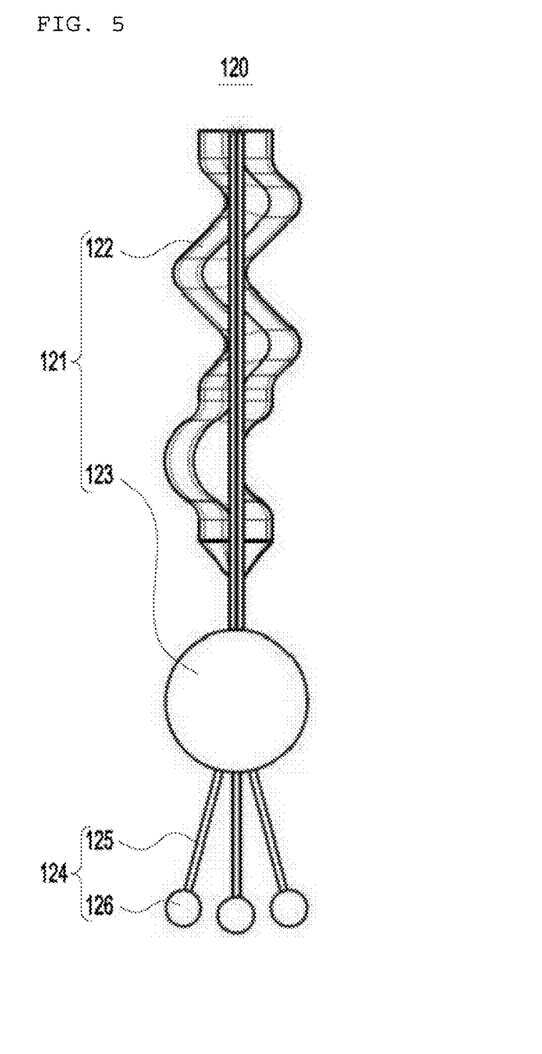
FIG. 5 is a side view illustrating the tread kerf of FIG. 4 according to the embodiment of the present invention.

FIG. 2 is a perspective view illustrating a tire with main kerfs and sub-kerfs according to an embodiment of the present invention. FIG. 3 is a perspective view illustrating a tread block of the heavy-duty tire with main kerfs and sub-kerfs according to the embodiment of the present invention. FIG. 4 is a perspective view illustrating a tread kerf of the heavy-duty tire according to the embodiment of the present invention. FIG. 5 is a side view illustrating the tread kerf of FIG. 4 according to the embodiment of the present invention.

Referring to FIGS. 2 to 5, the tire with main kerfs and sub-kerfs, which is designated by reference numeral 100, according to the embodiment of the present invention includes a tread coming into contact with the road surface according to the rotation of its wheel, and tread blocks 110 formed in a block shape on the tread.

Each of the tread blocks 110 has a grooved main kerf 121 and a grooved sub-kerf 124 formed for drainage performance and running and braking performance. The main kerf 121 includes a main groove 122 and a main flow tube 123 which will be described later, and the sub-kerf 124 includes an auxiliary groove 125 and an auxiliary flow tube 126 which will be described later.

Meanwhile, the main groove 122 is formed to the center of the tread block 110 across the upper surface thereof.

In detail, the tire includes a tread coming into contact with the road surface, and the tread has tread blocks 110 divided in a block shape to improve drainage performance and grip performance as the wheel rotates. Accordingly, the tread blocks 110 are provided to improve frictional force by contact with the road surface and to perform drainage through a groove 140 formed between each of the blocks 110 and another block 130.

The tread block 110 has a main groove 122 traversing the upper surface thereof. Since the main groove 122 is a plate-shaped groove formed to the center of the tread block 110 across the upper surface thereof, it is possible to improve running performance and braking performance by increasing frictional force with the road surface and to smoothly perform drainage along the groove.

In addition, the main groove 122 is formed in a zigzag shape on the upper surface and side surface of the block.

In detail, the main groove 122 has a plate shape, and is corrugated in a zigzag shape when viewed from the side thereof. Accordingly, this corrugation can increase traction force from various directions and prevent the tire from leaning when the tire rotates as compared with a straight structure.

Meanwhile, a main flow tube 123 passing through the side surface of the tread block 110 is formed at the lower end of the main groove 122.

In detail, the main flow tube 123 has a cylindrical shape and is connected to the lower end of the main groove 122 while passing through the side surface of the tread block 110. Accordingly, it is possible to rapidly discharge the heat generated in the tire since the main flow tube 123 is connected to the main groove 122 so that air flows therethrough, and it is possible to improve drainage performance since water is drained through the main flow tube 123.

In this case, the main flow tube 123 may be a venturi meter tube. This tube can improve heating performance since it maintains the fast flow of air by a pressure difference and can also improve drainage performance since it rapidly performs drainage by a pressure difference, compared to a cylindrical tube.

In addition, the main flow tube 123 may have a triangular shape, a square shape, or a polygonal shape as long as it easily performs a flow of air and drainage.

Meanwhile, there is additionally provided an auxiliary groove 125 that is connected to the lower end of the main flow tube 123 to extend to the lower end of the tread block 110.

In detail, the auxiliary groove 125 has a plate shape so as to be connected to the lower end of the main flow tube 123 to extend to the lower end of the tread block 110. Accordingly, when the height of the tread block 110 is lowered due to the wear of the tread and the main groove 122 and the main flow tube 123 are worn out, the additional auxiliary groove 125 allows the frictional force with the road surface to be increased, thereby improving running and braking performance and enabling drainage to be smoothly performed along the groove.

That is, the auxiliary groove 125 is formed beneath the main groove 122 and the main flow tube 123. Therefore, when the main groove 122 and the main flow tube 123 are worn out, the auxiliary groove 125 increases frictional force by the contact with the road surface through a structure in which it is formed perpendicular to the direction of rotation of the wheel from the road surface, thereby improving running and braking performance and enabling drainage to be smoothly performed along the groove.

In addition, there is additionally provided an auxiliary flow tube 126 that is connected to the lower end of the auxiliary groove 125 to pass through the side surface of the tread block 110.

In detail, the auxiliary flow tube 126 has a cylindrical shape so as to be connected to the lower end of the auxiliary groove 125 to pass through the side surface of the tread block 110. Accordingly, it is possible to rapidly discharge the heat generated in the tire since the auxiliary flow tube 126 is connected to the auxiliary groove 125 so that air flows therethrough, and it is possible to improve drainage performance since water is drained through the main flow tube 123.

In this case, the auxiliary flow tube 126 may be a venturi meter tube. This tube can improve heating performance since it maintains the fast flow of air by a pressure difference and can also improve drainage performance since it rapidly performs drainage by a pressure difference, compared to a cylindrical tube.

In addition, when the height of the tread block 110 is lowered due to the wear of the tread and the main groove 122, the main flow tube 123, and the auxiliary groove 125 are worn out, the additional auxiliary flow tube 126 allows the frictional force with the road surface to be increased, thereby improving running and braking performance and enabling drainage to be smoothly performed along the groove.

That is, the auxiliary flow tube 126 is formed beneath the main groove 122, the main flow tube 123, and the auxiliary groove 125. Therefore, when the main groove 122, the main flow tube 123, and the auxiliary groove 125 are worn out, the auxiliary flow tube 126 increases frictional force by the contact with the road surface through a structure in which it is formed perpendicular to the direction of rotation of the wheel from the road surface, thereby improving running and braking performance and enabling drainage to be smoothly performed along the groove.

Meanwhile, the auxiliary groove 125 and the auxiliary flow tube 126 may be each at least two in number beneath the main flow tube 123.

In detail, when two or more auxiliary grooves 125 and auxiliary flow tubes 126 are disposed, the auxiliary grooves 125 and the auxiliary flow tubes 126 may be arranged radially at equal intervals around the main flow tube 123.

Since the auxiliary grooves 125 and the auxiliary flow tubes 126 are arranged radially at regular intervals, the tire blocks are constantly divided by the groove structure of the auxiliary grooves 125 and the auxiliary flow tubes 126 according to the wear of the tire. Therefore, it is possible to uniformly maintain the frictional force and drainage performance generated by the contact with the road surface, and consequently to constantly maintain the running performance and braking performance of the vehicle.

Meanwhile, the inner diameter of the auxiliary flow tube 126 is greater than the width of the auxiliary groove 125, and is smaller than the inner diameter of the main flow tube 123.

In detail, the auxiliary flow tube 126 is greater than the width of the auxiliary groove 125 so as to smoothly perform the flow of air and drainage. If the auxiliary flow tube 126 is smaller than the width of the auxiliary groove 125, it may malfunction since air or water flows through the auxiliary groove 125 having a greater width. Therefore, the inner diameter of the auxiliary flow tube 126 must be greater than the width of the auxiliary groove 125.

In addition, the inner diameter of the auxiliary flow tube 126 is smaller than the inner diameter of the main flow tube 123. If the inner diameter of the auxiliary flow tube 126 is greater than the inner diameter of the main flow tube 123, as the auxiliary flow tube 126 is formed at the lower end of the tire block, the support force at the lower end of the tire block is reduced due to the auxiliary flow tube 126 formed at the lower end thereof when the frictional force by the rotation of the wheel is applied thereto, which leads to a risk of damaging the tire block.

Since the most heat is generated in the surface of the tire coming into contact with the road surface, it is efficient that the inner diameter of the auxiliary flow tube 126 is smaller than the inner diameter of the main flow tube 123 to rapidly discharge the heat and rapidly perform the drainage required for the tire block.

Figure 6:
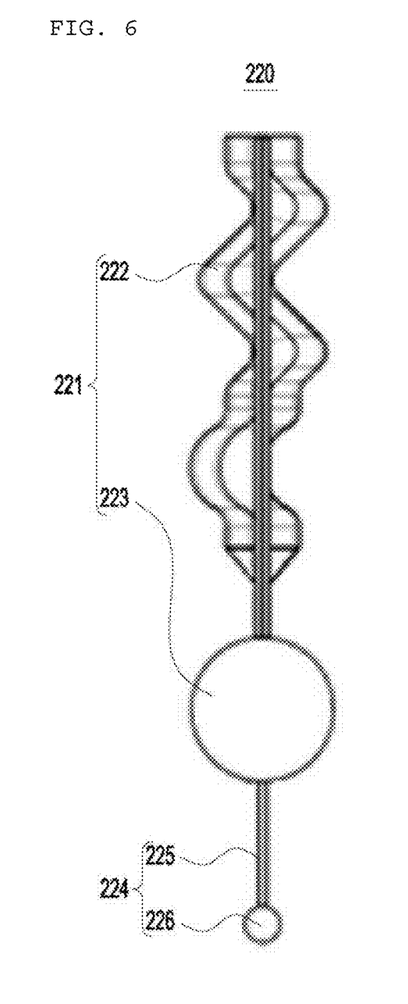
FIG. 6 is a side view illustrating a tread kerf according to another embodiment of the present invention.

FIG. 6 is a side view illustrating a tread kerf according to another embodiment of the present invention.

Referring to FIG. 6, the tread kerf 220 according to the present invention may include one auxiliary groove 225 and one auxiliary flow tube 226 according to the performance of the tire.

In detail, the auxiliary groove 225 and an auxiliary flow tube 226 may be disposed on the same line with respect to the sides of a main groove 222, a main flow tube 223, and a tread block 110.

Since the auxiliary groove 225 and an auxiliary flow tube 226 are disposed on the same line, the tire blocks are constantly divided by the groove structure of the auxiliary groove 225 and the auxiliary flow tube 226 according to the wear of the tire. Therefore, it is possible to uniformly maintain the frictional force generated by the contact with the road surface and drainage performance, and consequently to constantly maintain the running performance and braking performance of the vehicle.

Figure 7:
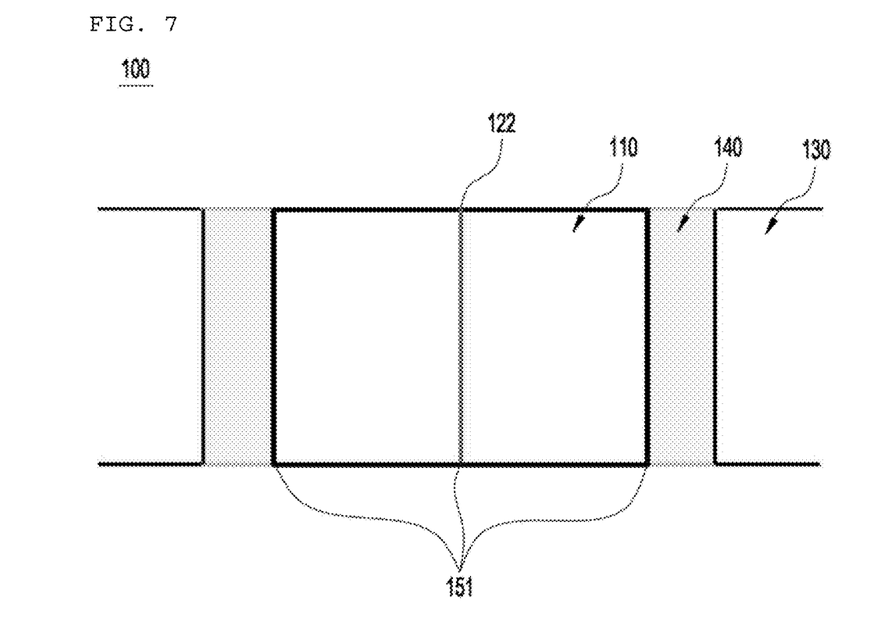
FIG. 7 is a top view illustrating the tire with main kerfs and sub-kerfs before wear according to the embodiment of the present invention.
Figure 8:
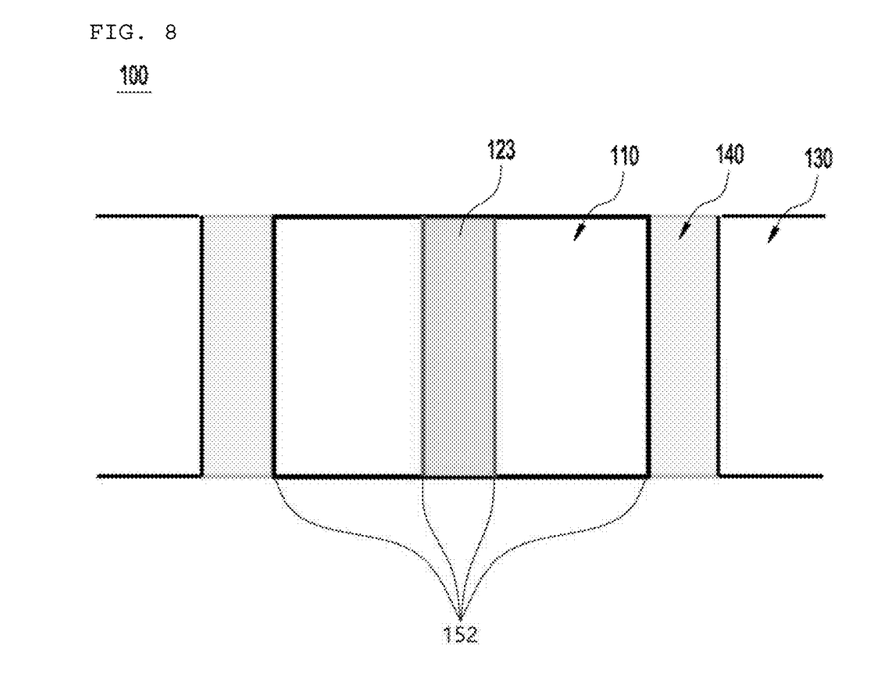
FIG. 8 is a top view illustrating the tire with main kerfs and sub-kerfs in which a main flow tube is exposed due to wear according to the embodiment of the present invention.
Figure 9:
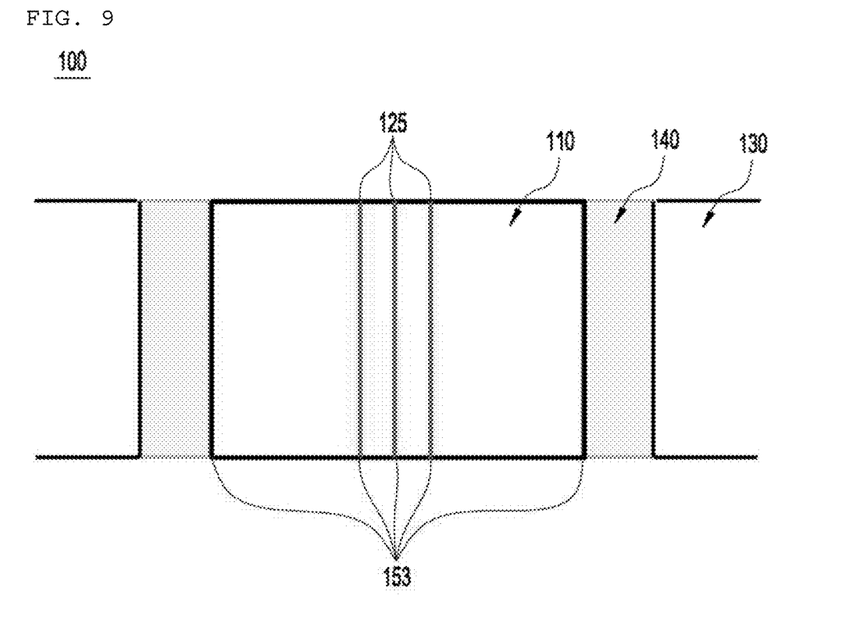
FIG. 9 is a top view illustrating the tire with main kerfs and sub-kerfs in which an auxiliary groove is exposed due to wear according to the embodiment of the present invention.
Figure 10:
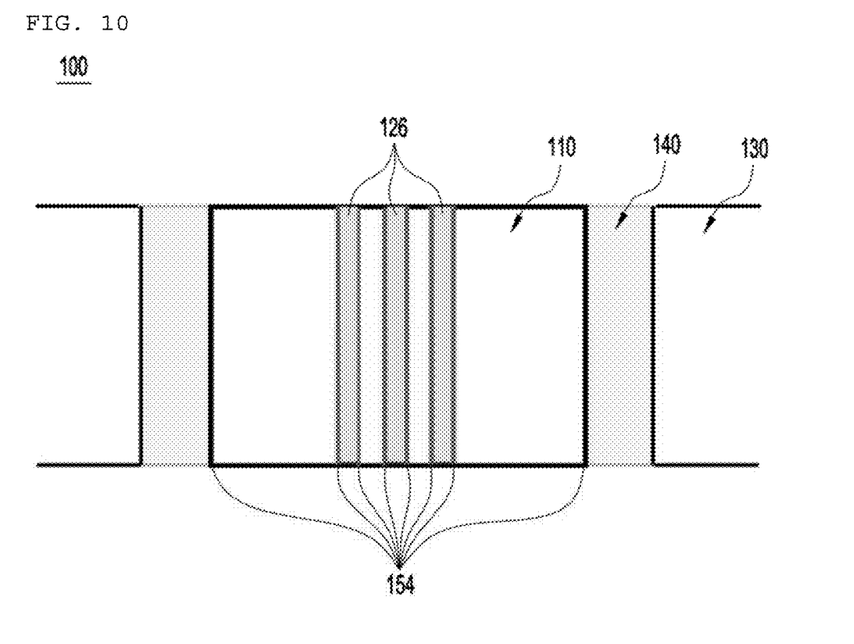
FIG. 10 is a top view illustrating the tire with main kerfs and sub-kerfs in which an auxiliary flow tube is exposed due to wear according to the embodiment of the present invention.

FIG. 7 is a top view illustrating the tire with main kerfs and sub-kerfs before wear according to the embodiment of the present invention. FIG. 8 is a top view illustrating the tire with main kerfs and sub-kerfs in which a main flow tube is exposed due to wear according to the embodiment of the present invention. FIG. 9 is a top view illustrating the tire with main kerfs and sub-kerfs in which an auxiliary groove is exposed due to wear according to the embodiment of the present invention. FIG. 10 is a top view illustrating the tire with main kerfs and sub-kerfs in which an auxiliary flow tube is exposed due to wear according to the embodiment of the present invention.

Referring to FIG. 7, the main groove 122 is formed to traverse the upper surface of the tread block 110. The tread block 110 has edges 151 formed on the upper surface thereof so as to be perpendicular to the direction of rotation of the tire due to the shape of the main groove 122. The tread block 110 has a total of three edges 151 formed on the upper surface thereof, and the three edges 151 are maintained while the main groove 122 is maintained on the upper surface of the tread block 110. Since the edges 151 are formed perpendicular to the direction of rotation of the tire, it is possible to increase frictional force from the road surface and improve drainage performance and running and braking performance by the edges 151.

Referring to FIG. 8, the main flow tube 123 is exposed due to the wear of the main groove 122 on the upper surface of the tread block 110. The tread block 110 has edges 152 formed on the upper surface thereof so as to be perpendicular to the direction of rotation of the tire due to the shape of the main flow tube 123. The tread block 110 has a total of four edges 152 formed on the upper surface thereof, and the four edges 152 are maintained while the main flow tube 123 is maintained on the upper surface of the tread block 110. Since the edges 152 are formed perpendicular to the direction of rotation of the tire, it is possible to increase frictional force from the road surface and improve drainage performance and running and braking performance by the edges 152.

Referring to FIG. 9, the auxiliary groove 125 is exposed due to the wear of the main flow tube 123 on the upper surface of the tread block 110. The tread block 110 has edges 153 formed on the upper surface thereof so as to be perpendicular to the direction of rotation of the tire due to the shape of the auxiliary groove 125. The tread block 110 has a total of five edges 153 formed on the upper surface thereof, and the five edges 153 are maintained while the auxiliary groove 125 is maintained on the upper surface of the tread block 110. Since the edges 153 are formed perpendicular to the direction of rotation of the tire, it is possible to increase frictional force from the road surface and improve drainage performance and running and braking performance by the edges 153.

Referring to FIG. 10, the auxiliary flow tube 126 is exposed due to the wear of the auxiliary groove 125 on the upper surface of the tread block 110. The tread block 110 has edges 154 formed on the upper surface thereof so as to be perpendicular to the direction of rotation of the tire due to the shape of the auxiliary flow tube 126. The tread block 110 has a total of eight edges 154 formed on the upper surface thereof, and the eight edges 154 are maintained while the auxiliary flow tube 126 is maintained on the upper surface of the tread block 110. Since the edges 154 are formed perpendicular to the direction of rotation of the tire, it is possible to increase frictional force from the road surface and improve drainage performance and running and braking performance by the edges 154.

That is, referring to FIGS. 7 to 10, since the tire with main kerfs and sub-kerfs 100 according to the present invention is additionally formed with the auxiliary groove 125 and the auxiliary flow tube 126, it is possible to improve the flow of air and drainage performance. Since the auxiliary groove 125 and the auxiliary flow tube 126 are formed beneath the main groove 122 and the main flow tube 123, it is possible to maintain drainage performance and running and braking performance by the contact with the road surface even though both of the main groove 122 and the main flow tube 123 are worn out.

Although the tire with main kerfs and sub-kerfs 100 according to the present invention is formed to have grooves, it may be made of a metal material such as steel or aluminum as in FIG. 4. The tread kerf 120 in which a metal or plastic-made kerf member suitable for the shape of the kerf is inserted into the tread kerf may be used.

In accordance with the embodiments of the present invention, the tire with main kerfs and sub-kerfs has effects of maintaining drainage performance and running and braking performance by additionally including the auxiliary groove and of improving a flow of air and drainage performance by including the auxiliary flow tube.

The present invention is not limited to the above effects, and it should be understood that the present invention includes all effects which can be inferred from the detailed description of the present invention or the configuration of the invention defined by the appended claims.

The above-mentioned embodiments of the present invention are merely examples, and it will be understood by those skilled in the art that various modifications may be made without departing from the spirit and scope or essential features of the invention. Therefore, it should be understood that the embodiments described above are for purposes of illustration only in all aspects and are not intended to limit the scope of the present invention. For example, each component described in a single form may be implemented in a distributed form, and similarly, components described in the distributed form may be implemented in a combined form.

The scope of the present invention is defined by the appended claims, and it should be construed that all modifications or variations derived from the meaning, scope, and equivalent concept of the claims fall within the scope of the invention.

What is claimed is:

1. A tire with main kerfs and sub-kerfs, comprising:
   a tread block formed in a block shape on a tread that is to contact a road surface;
   a main groove formed toward a center of the tread block across an upper surface of the tread block;
   a main flow tube connected to a lower end of the main groove to pass through a side surface of the tread block, to enhance a flow of air and drainage performance;
   two or more auxiliary grooves connected to a lower end of the main flow tube to extend toward a lower end of the tread block, thereby exhibiting the drainage performance and running and braking performance; and
   two or more auxiliary flow tubes respectively connected to lower ends of the two or more auxiliary grooves to pass through the side surface of the tread block, to enhance the flow of air and the drainage performance,
   wherein the two or more auxiliary grooves are radially arranged at equal intervals from a central axis of the main flow tube, and each of the two or more auxiliary grooves has a plate shape straightly extending from the main flow tube to the respective auxiliary flow tube, and
   wherein each of the two or more auxiliary flow tubes has an inner diameter that is greater than a width of the respective auxiliary groove and smaller than an inner diameter of the main flow tube.

2. The tire according to claim 1, wherein the two or more auxiliary grooves and the two or more auxiliary flow tubes form a plurality of edges arranged to be perpendicular to the road surface when the tread block is worn out.

3. The tire according to claim 2, wherein the main groove is formed in a zigzag shape on the upper surface and on the side surface of the tread block.

* * * * *